April 26, 1955  E. D. DAHLMAN  2,706,878
POTATO DIGGING AND CONVEYING MACHINE
Filed Feb. 19, 1949  3 Sheets-Sheet 1
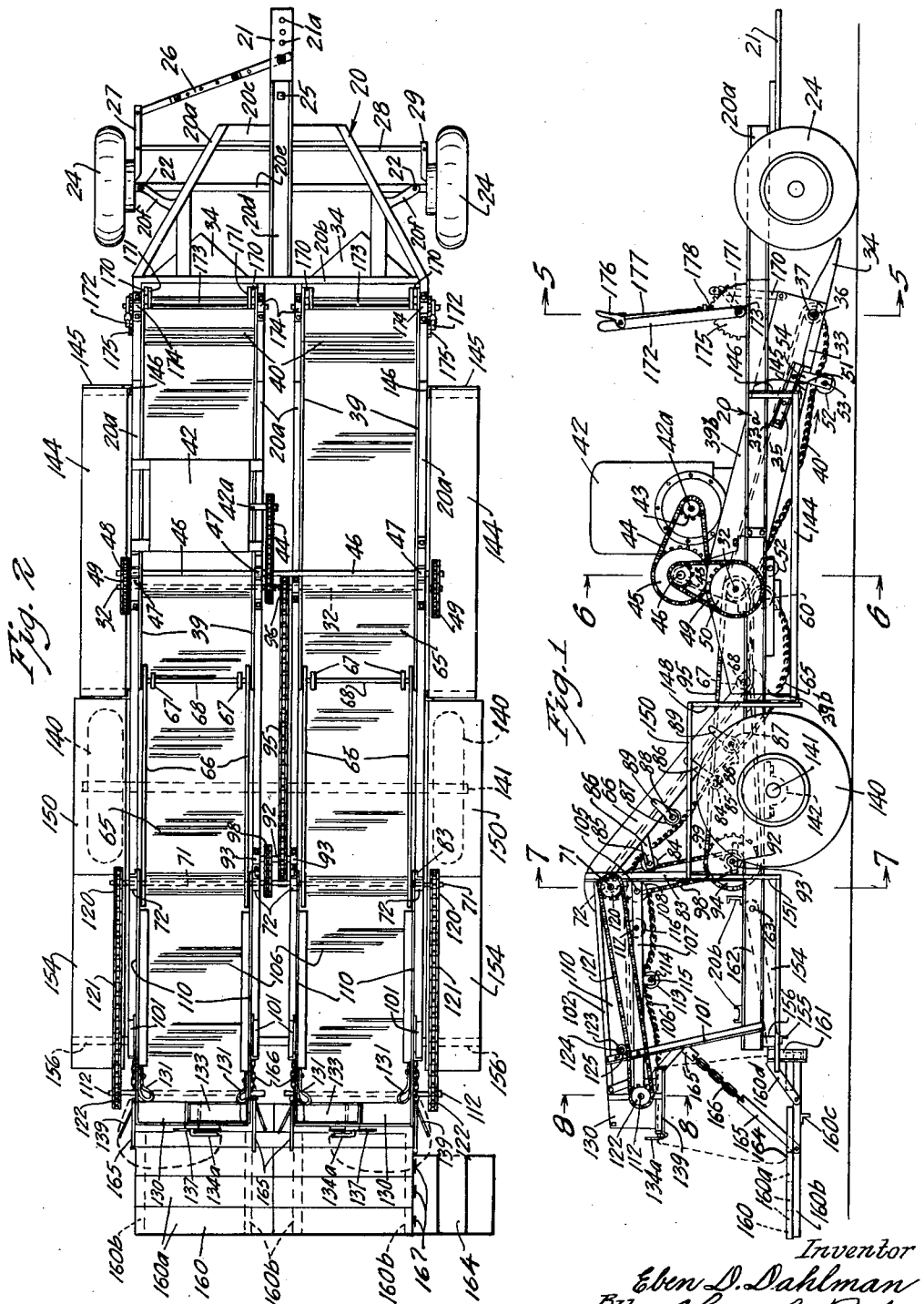
Inventor
Eben D. Dahlman
By Chas. C. Reif
Attorney

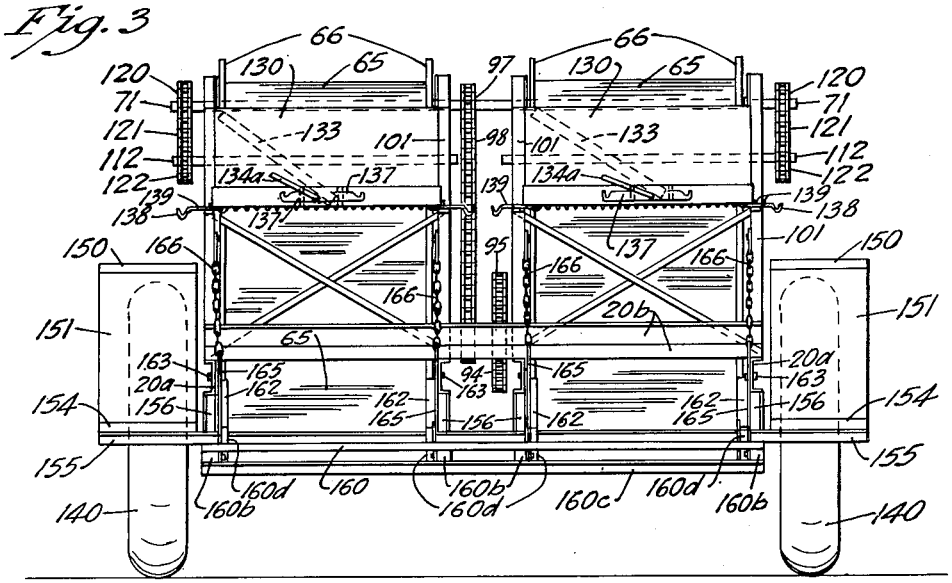

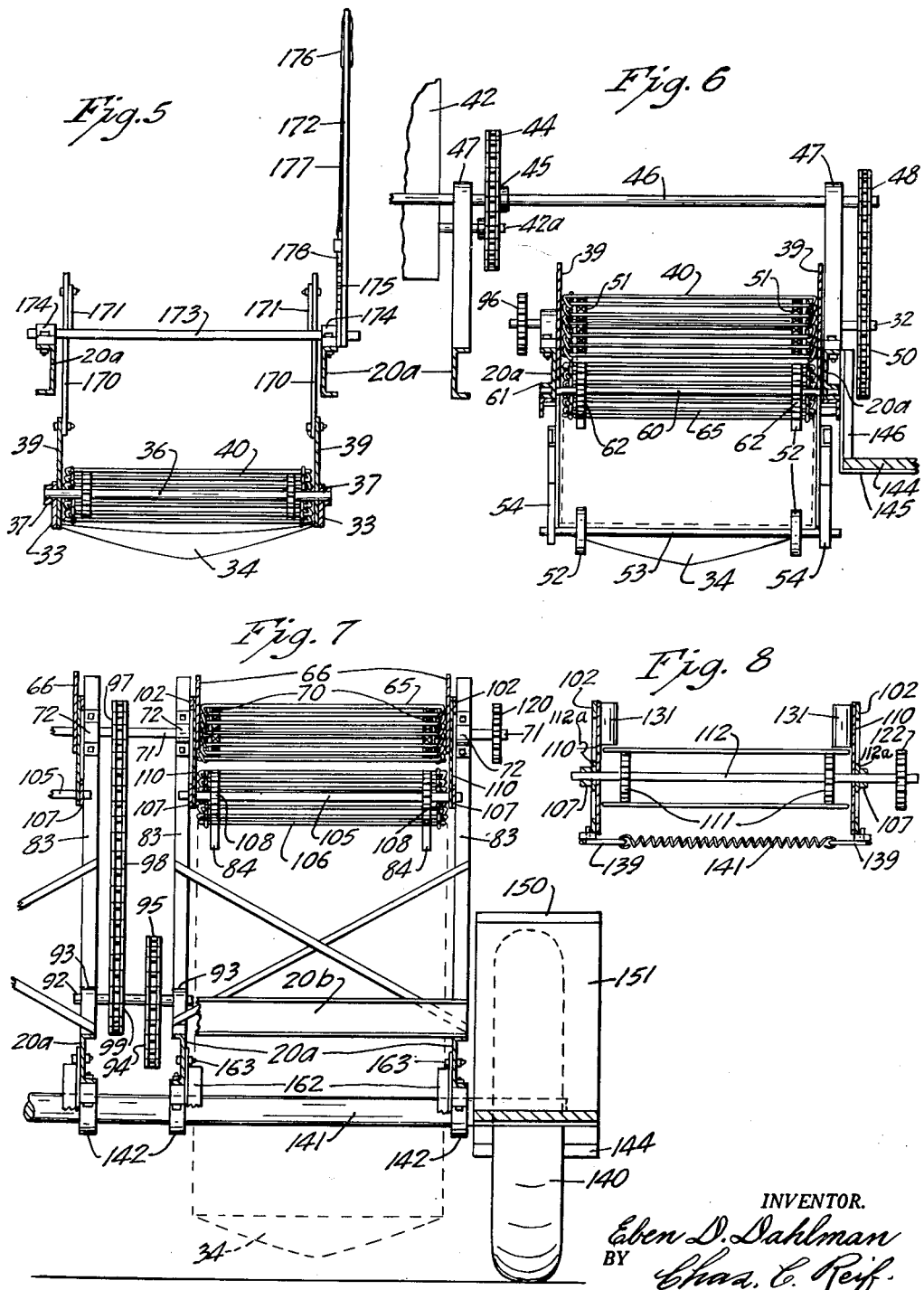

United States Patent Office 2,706,878
Patented Apr. 26, 1955

2,706,878

POTATO DIGGING AND CONVEYING MACHINE

Eben D. Dahlman, Grandy, Minn., assignor to Dahlman Manufacturing Company, Braham, Minn., a corporation of Minnesota Application February 19, 1949, Serial No. 77,401

9 Claims. (Cl. 55—51)

This invention relates to a potato harvester, and particularly to a harvester adapted to simultaneously harvest potatoes from two adjacent rows.

Such a harvester which has means for elevating the potatoes and elevating picking conveyors, together with sacking means, is sometimes called a potato combine.

It is an object of this invention to provide an efficient potato harvester adapted to simultaneously dig and harvest potatoes from two adjacent rows, the same comprising a pair of digging blades, conveyors in the rear of said blades for receiving the lifted potatoes, elevating conveyors in the rear of said conveyors and picking conveyors in the rear of said elevating conveyors, together with means for supporting operators for picking the vines and other extraneous matters from the conveyors, said harvester being adapted to be drawn by a tractor and having a motor mounted thereon for driving said conveyors.

It is another object of the invention to provide a potato harvester or potato combine comprising an elongated frame having means for connection to a tractor, means for supporting said frame in its movement, a pair of laterally spaced blades carried by and beneath said frame constructed and arranged to lift potatoes from two adjacent rows, means for moving and holding said blades in different vertical positions, conveyors in the rear of said blades respectively for receiving potatoes lifted thereby and movable longitudinally of said frame, elevating conveyors in the rear of said conveyors longitudinally alined therewith and extending upwardly and rearwardly, picking conveyors at the upper rear ends of said elevating conveyors and adapted to receive therefrom, a motor mounted on said frame preferably at the forward end thereof, and driving means connecting said motor and said conveyors.

It is a further object of the invention to provide such a harvester as set forth in the preceding paragraph, together with bagging means at the rear of each of said picking conveyors and a platform extending across the rear of said harvester adapted to support operators for manipulating said bagging means.

It is also an object of the invention to provide a potato harvester comprising an elongated frame, a pair of laterally spaced blades adapted to move in adjacent rows of potatoes to lift potatoes, conveyors in the rear of each of said blades respectively, elevating conveyors in the rear of each of said conveyors respectively, picking conveyors in the rear of each of said elevating conveyors respectively, and platforms at each side of said harvester extending from substantially the midpoint of said first mentioned conveyors rearwardly to the ends of said picking conveyors.

It is still another object of the invention to provide such a harvester as set forth in the preceding paragraph, said frame having a pair of wheels at the rear of the longitudinal center for supporting the same and having a smaller pair of wheels at its front end, a portion of said platforms extending over the tops of said first mentioned wheels respectively.

These and other objects and advantages of the invention will be fully set forth in the following description made in connection with the accompanying drawings in which like reference characters refer to similar parts throughout the several views and in which:

Fig. 1 is a view in side elevation of said harvester;
Fig. 2 is a plan view of said harvester;
Fig. 3 is an enlarged view in rear elevation of said harvester;
Fig. 4 is an enlarged plan view of the rear part of one of the picking conveyors shown on an enlarged scale;
Fig. 5 is an enlarged vertical section taken on line 5—5 of Fig. 1;
Fig. 6 is an enlarged vertical section taken on line 6—6 of Fig. 1;
Fig. 7 is an enlarged vertical section taken on line 7—7 of Fig. 1; and
Fig. 8 is an enlarged vertical section taken on line 8—8 of Fig. 1; said Figures 5, 6, 7 and 8 being taken in the directions shown by the arrows.

Referring to the drawings, a potato harvester is shown comprising an elongated frame 20. While this frame might be variously constructed, in the embodiment of the invention illustrated it comprises laterally spaced pairs of longitudinally extending frame members 20a shown in the form of channel members having their flanges directed outwardly. Frame 20 also comprises transversely extending members 20b longitudinally spaced along said members 20a. The front ends of the members 20a converge somewhat, as shown in Fig. 2, and are connected at their ends by a cross bar 20c. A member 20d extends forwardly centrally from the front cross bar 20b, the same being illustrated as a channel bar. Member 20d extends over the cross bar 20c and has a hitch bar 21 connected to its front end, the same being shown as having a plurality of longitudinally spaced holes 21a therethrough. A cross bar 20e is provided and brackets 20f extend from the frame to adjacent the ends of cross bar 20e, said brackets and cross bar receiving pivot members 22 on which front wheels 24 are pivoted in the same manner as automobile wheels are pivoted. The hitch bar 21 is movable about a vertically extending pivot bolt 25 and a bar 26 extends from hitch bar 21 to an arm 27 secured to one of the wheels 24. A rod 28 extends from arm 27 to another arm 29 secured to the other wheel 24. If hitch bar 21 is swung about pivot 25, wheels 24 will thus be turned accordingly for steering.

A pair of shafts 32 extend across frame 20 some distance in the rear of the front end of said frame, said shafts being supported in suitable bearings and frames 33 are mounted to swing about pivots 33a secured in bars 35 and extend forwardly and downwardly from said pivots. At the front end of each of the frames 33 is secured centrally thereof a digging or lifting blade 34. Shafts 36 extend across the front of each frame 33 being journaled in suitable bearings 37 secured at the sides of frames 33. Frames 33 have side plates or side boards 39a at each side thereof disposed in vertical planes and the rear ends of plates 39a are of arcuate form and fit against the front ends of plates 39b which extend forwardly beyond shafts 32. Within the side plates 39a shafts 36 carry sprockets over which runs an endless conveyor 40 comprising longitudinally spaced transversely extending cylindrical rods having their ends bent to be inter-engaged with each other, as shown in the rods illustrated in Fig. 4. Similar sprockets are secured to shafts 32 within the plates 39b and conveyor 40 runs over said latter sprockets. The front ends of the top runs of conveyor 40 are disposed so that potatoes lifted by the blades 34 will pass on to said top runs and be carried upwardly. Usually some vines, clods of dirt, stones and other extraneous matter also pass onto the conveyors 40. Said material will be carried on said conveyor between the side plates 39.

A motor 42 is mounted on the frame 20, and in the embodiment of the invention illustrated it is shown as mounted on one pair of the longitudinal frame members 20a, the same having a driving shaft 42a extending parallel to shaft 32. In practice the motor 42 has been of the internal combustion type. Said driving shaft 42a has a sprocket 43 secured thereto over which runs a chain 44 also running over a sprocket 45 secured to a shaft 46, which shaft extends across frame 20 and is journaled in suitable bearings 47 mounted on frame 20. Shaft 46 has sprockets 48 secured thereto adjacent its ends at the outer sides of frame 20 and chains 49 run over sprockets 48 and also over larger sprockets 50 secured to the shafts 32 already described which carry the driving sprockets for conveyor 40. The lower runs of conveyor 40 are supported upon rollers 52 secured to shafts 53 journaled in bars 54 which are secured to the sides of frame 33, by bolts 51 which also secure bar 25.

Shafts 60 are journaled in bearings 61 mounted on the frame members 20a. Shaft 60 carries sprockets over which runs an endless link conveyor 65 similar to conveyor 40. Conveyor 65 runs between the rear portions of side plates 39 and then between upwardly inclined side plates 66 substantially alined with and forming in effect a continuation of side plates 39. The front portions of the upper runs of conveyors 65 are disposed substantially horizontally and pass from sprockets 62 rearwardly under rollers 67 mounted on shafts 68 journaled in the side plates 39. From rollers 67 the upper runs of conveyors 65 extend upwardly at a rather steep angle and pass over sprockets 70 at their upper ends secured to shafts 71 journaled in bearings 72 secured to vertical members 83 forming part of the frame of the machine. The lower runs of conveyors 65 pass over rollers 84 secured to shafts 85 journaled in bars 86 secured to the side plates 66. Said lower runs also pass under similar rollers 87 secured to shafts 88 journaled in bars 89 also secured to the side plates 66.

A shaft 92 extends across frame 20, the same being journaled in suitable bearings 93 secured to said frame. Shaft 92 has secured thereto a sprocket 94 over which runs a chain 95 also running over a sprocket 96 secured to one of the shafts 32. Shaft 71 has a sprocket 97 secured thereto and a chain 98 runs over sprocket 97 and over a sprocket 99 secured to shaft 92. Shaft 71 is thus driven by chain 98 which in turn is driven from shaft 92 which is driven from one of the shafts 32 by chain 95. The frame of the machine comprises vertically and slightly rearwardly extending members 101 which are secured to longitudinally extending frame members 102 which are also secured to the vertical frame members 83.

Shafts 105 are journaled in bearings in frame members 107 secured to members 83 and 101. Shafts 105 carry sprockets 108 over which run the front ends of endless conveyors 106 disposed between the pairs of frame members 20a and longitudinally alined with conveyors 40 and 65. Conveyors 106 also run over sprockets 111 secured to shafts 112 journaled in bearings 112a carried on the frame members 107. The lower runs of conveyors 106 are supported upon rollers 113 carried on shafts 114 journaled in bearings 115 secured to frame members 107. The upper runs of conveyors 106 adjacent their front ends run over rollers 116 carried on shafts 117 journaled in the frame members 107. Shaft 71 has sprockets 120 secured thereto adjacent each end thereof and chains 121 run over sprockets 120 respectively and over sprockets 122 secured to shafts 112 respectively. Conveyors 106 are thus driven from shaft 112 through the chains 121. The receiving end of conveyors 106 is thus somewhat below the delivery ends of conveyors 65. Chain tightening sprockets 123 are shown engaging the top runs of chains 121 being carried on short shafts 124 carried in bearings 125 secured to frame members 101.

The conveyors 106 deliver to a transversely extending trough or chute 130 along the sides of which the side plates 110 extend, said chute having a rear wall 130a. Secured to the inner sides of each side plate 110 is a potato guide member 131 which is of a flexing or yielding quality and is shown as formed by a flexible band such as leather or stiff fabric folded into a bight and extending inwardly a short distance over the conveyors 106. The bight portion of members 131 is directed rearwardly and the same extends to substantially the ends of conveyors 106. The bottom of the chutes 130 are formed by plates 133 which are secured to a rod 134 which extends longitudinally substantially centrally of each conveyor 106. The rod 134 extends some distance in the rear of chute or trough 130 and is provided with a handle portion 134a. Each plate 133 forms a bottom for substantially half of the trough, the other half then being open so that potatoes can drop downwardly. Hooks 136 are disposed at each side of the open portion in each of the troughs 130, there being two such open portions in each trough. A hook 137a is provided adjacent the inner side of each open portion and carried on a bar 137 secured centrally to the rear of the end 130a of trough 130. Hooks 138 are carried on rods 139 which are pivoted on pivots 143 carried on the side plates 110, said rods 139 extending beyond pivots 143 and having their rear ends connected by a tensile coiled spring 141.

The frame 20 is supported adjacent its rear end by a pair of wheels 140 secured to an axle 141 extending across frame 20 and carried in suitable bearings 142 secured to said frame. Wheels 140 are somewhat larger than wheels 24 and both are shown as equipped with pneumatic tires. The inner sides of wheels 140 are disposed rather close to the outer sides of the outer frame members 20a. A platform 144 is provided at each side of the frame 20 adjacent the front end thereof, said platform being supported upon bars 145 in turn carried by vertical bars 146 secured to frame members 20a. The platforms, as shown in Figs. 1 and 2, extend along the greater part of the conveyors 40 and along the rear part of conveyors 65. Vertical boards or plates 148 extend upwardly from the rear ends of platforms 144 and platforms 150 are supported on the members 148 and on similar vertically extending members 151 at the rear side of wheels 140. The platforms 150 are thus disposed over the wheels 140 and extend along the sides of the upwardly inclined portions of conveyors 65. Platforms 154 extend rearwardly from the lower ends of members 151 and are supported upon a transversely extending angle bar 155 secured to members 156 in turn secured to the members 20a. The platforms 154 are disposed at a level slightly above the platforms 144 and will support operators standing thereon and working on the potatoes carried on the conveyors 106. A rear platform 160 is provided, the same being formed of boards or planks 160a supported on rearwardly extending parallel members 160b. Members 160b are shown as being connected by a transversely extending angle bar 160c. The members 160b are secured to vertically extending bars 161 secured to bars 162 which are disposed at either side of the platform and extend forwardly where they are pivotally connected to the outer frame members 20a by bolts 163. Brace members 160d are shown connecting members 161 and members 160b. The platform is normally supported by bars 162 resting on the transversely extending bar 155. The platform is also supported by bars 165 secured respectively to the members 160b and the frame members 101. Bars 165 are connected by flexible members shown as chains 166. The platform 160 is thus capable of swinging upwardly about pivots 163 should it pass over some object which would tend to raise it. An auxiliary platform 164 is hinged to one end of platform 160 by hinges 167. Platform 164 is supported in horizontal position but may be folded inwardly onto platform 160. The vertical position of blades 34 can be varied and for this purpose frames 33 are made oscillatable about shafts 32. For this purpose links 170 are connected at their lower ends to side plates 39 and are pivotally connected at their upper ends to arms 171 secured to a shaft 173. A lever 172 is connected to each of the shafts 173 and thus is rigidly connected to the arms 171, said lever being swingable with shaft 173 which is journaled in bearings 174 secured to the outer frame members 20a. Lever 172 moves alongside of a toothed sector or quadrant 175 secured to fame member 20a and has a spring operated handle crank 176 pivoted adjacent its upper end which carries a rod 177 to the lower end of which is secured a tooth or detent 178 adapted to be disposed between the teeth on member 175. When lever 172 is swung, arms 171 will be oscillated and will raise or lower links 170 which will in turn raise or lower frame 33 and blades 34. As shown in Fig. 2, there is a lever 172 and its attendant mechanism for each frame 33.

In operation the harvester will be suitably hinged to a tractor by means of the draw bar or link bar 21. The motor 42 will be operated, the harvester will be drawn along the potato rows with the bar 21 traveling substantially midway between the rows, motor 42 will be operated and shaft 46 will be driven from motor shaft 42 through chain 44. Shaft 46 will in turn drive shaft 42 through chain 49. Shaft 32 will drive shaft 92 through the chain 95. Shaft 92 will drive shaft 71 through the chain 98 and shaft 71 will in turn drive shafts 111 through the chains 121. Conveyors 40, 65 and 106 will thus be moved so that their top runs will travel rearwardly. The blades 34 will be adjusted so that they will move through the ground and lift the potatoes in each hill or the potatoes attached to each vine. The potatoes will move rearwardly on the blades and onto conveyors 40. The top runs of conveyors 40 incline upwardly somewhat and the potatoes and other matter will move upwardly on said top runs. Operators can sit on platforms 144 and pick out the vines and other coarser extraneous matter which might be on the conveyors 40. The potatoes pass over the top rear end of conveyors 40 and drop onto the substantially horizontal portions of conveyors 65. The potatoes have a short drop which tends to loosen any dirt which might be thereon. The distance of the drop is not enough to objectionably bruise the potatoes. The potatoes and other matter now move upwardly on conveyors 65 and operators can be disposed on platforms 144 and 150 and pick some extraneous matter from these conveyors. The conveyors 65 deliver to the conveyors 106. These conveyors are at a considerable and convenient height for the picking operators to stand on the platforms 154 as shown in the drawings. Operators will stand on platforms 154 and can pick out any foreign or extraneous matter such as stones, clods, etc. which is still mixed with the potatoes. The potatoes will pass to the rear of conveyors 106 and will drop into the troughs 130. Operators will stand on the rear platform 160 and a potato receiving bag 180 will have its top edge hooked over the hooks 131, 136 and 137a. The operator will swing in one of the rods 139 and will also hook the top of the bag over the hook 138. When rod 139 is released, the spring 141 will swing rod 139 outwardly thus tensioning the top of the bag and holding the same in open position. The potatoes will drop through the chute into the bag 180. The bags can be moved laterally onto platform 164 and then collected.

From the above description it will be seen that I have provided a very efficient and easily operated potato harvester which will harvest potatoes from two rows simultaneously. While the harvester must be drawn by a tractor the operational parts thereon are driven from a separate motor carried on the harvester frame. This insures that there will be ample power for moving all of the conveyors. The drive for the conveyors is simple and convenient. The platforms provided are effectively disposed so that the pickers can conveniently reach all of the conveyors.

By having the engine or motor mounted on the frame of the harvester, power is not required from the tractor and the device can be pulled by quite a small tractor, such as the common two plow bottom tractor of the Ford or other make. Also by having the motor on the frame the parts of the harvester can be operated in a much steadier manner than if the power is taken from the pulling tractor. With the motor mounted on the frame, much more variation and flexibility in speed can be had. The speed is independent of the speed of the pulling tractor. Also by having three conveyors and platforms for all of them so that the picking operators can work on the material on all of said conveyors, the machine can travel at a much faster rate and yet the operators have time to get the extraneous matter separated from the potatoes. It will be understood the faster the machine travels, the greater is the volume of potatoes and extraneous matter to be handled. With only one conveyor from which the extraneous matter could be picked, the potatoes could not be cleaned. Enough conveyor space must thus be used to give the operators time to pick out all of the extraneous matter. By driving the conveyors by a separate motor the speed of the conveyors can be varied and be independent of the speed of travel of the machine. It will be noted from the relative sizes of the driving sprockets 48—50, 96—94, and 120—122, that conveyors 40 have the fastest travel. Conveyors 65 travel considerably slower than conveyors 40 and the rear picking conveyors travel at about the same speed as the conveyors 65. The vines, weeds and larger extraneous matter can be picked off by the operators on platforms 144. The removal of this larger material does not require so many movements of the operators. The operators on platforms 150 can also pick some of the extraneous material from the conveyors 65. The extraneous materials delivered to the picking conveyors will comprise the potatoes and smaller extraneous matter such as stones and clods. It will take more movements of the operators to pick out the smaller extraneous objects so that the picking conveyors must also travel somewhat slowly. By having operators alongside all of the conveyors the increased volume of material can be conveniently handled even though the machine is traveling across the field at high speed.

Applicant's device makes a remarkable saving in the labor necessary for harvesting. It would take thirty-five operators to harvest two rows in the same time as applicant's machine does this with from six to eight operators. The cost per bushel of harvesting the potatoes over manual harvesting has been cut substantially sixty-five per cent. The cost of harvesting over a single row digger and picker has been cut substantially in half. Better results are obtained than by hand picking. The potatoes are subjected to less bruising in applicant's harvester than in any other known method. The device has been amply demonstrated in actual practice, found to be very successful and efficient and commercial production has been commenced.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A potato digger and picker machine adapted to handle the potatoes, vines, weeds, etc. from two rows of potatoes having in combination, an elongated wheel-supported frame having means to be connected to a tractor, a pair of laterally spaced digger blades adjacent the front of said frame arranged to move along adjacent rows of potato plants, a slightly upwardly inclined endless potato-supporting openwork link conveyor longitudinally aligned with each of said blades in the rear thereof for receiving potatoes, vines and other material lifted by said blades, a second endless potato-supporting openwork link conveyor in the rear of each of said conveyors and longitudinally aligned therewith extending upwardly and rearwardly at a decided angle and having its forward end disposed to receive potatoes, etc. from said first mentioned conveyor, an endless picking link conveyor in the rear of each of said second conveyors longitudinally aligned therewith and having its forward end disposed to receive potatoes, etc. from said second conveyor and being disposed at a much higher level than said first mentioned conveyor, platforms at each side of said frame for supporting operators at the sides of all of said conveyors, a motor carried on said frame, and driving means connected to said motors and conveyors for moving all of said conveyors to move said potatoes, etc. rearwardly, said second mentioned conveyors being driven at considerably lower speed than said first mentioned conveyors and said picking conveyors being driven at substantially the same speed as said second conveyors.

2. The structure set forth in claim 1, the platforms adjacent said second conveyors being disposed quite a distance above said other platforms.

3. A potato digger and picker machine for digging two rows simultaneously and handling the potatoes therefrom having in combination, a frame having longitudinally extending transversely spaced members, a pair of laterally spaced digger blades arranged to move along adjacent rows of potato plants, a pair of wheels supporting the front of said frame in advance of said digger blades, said wheels being disposed outwardly thereof respectively, a slightly upwardly inclined endless potato-supporting conveyor comprising swingably connected transversely extending spaced rods in the rear of each of said digger blades, a second endless potato-supporting picker conveyor comprising swingingly connected transversely extending spaced rods in the rear of each of said first mentioned conveyors, said second conveyor having one end extending substantially horizontal with its front part disposed under the end of said first mentioned conveyor, said second conveyor extending upwardly at a decided angle, a third endless picker conveyor comprising swingingly connected transversely extending spaced rods in the rear of each of said second conveyors, said third conveyor having its front end portion disposed below the rear end portion of said second conveyor, said third conveyors being disposed at a much higher elevation than said first mentioned conveyor and extending slightly downwardly toward its rear end, a pair of supporting wheels for said frame carried thereby and disposed at the sides of said second conveyors, a platform at each side of said frame extending longitudinally thereof at the sides of said third conveyors respectively quite a distance below the same for supporting operators, platforms extending above said last mentioned wheels at the sides of said second conveyors for supporting operators, and platforms at the sides of said frame extending along the front portion of said second conveyors and the rear portion of said first conveyors for supporting operators, whereby vines and the larger extraneous material can be picked from said first mentioned and second conveyors and smaller stones and other smaller extraneous material can be picked from said third conveyors and means carried on said frame for driving all of said conveyors to move their top runs rearwardly.

4. The structure set forth in claim 3, said last mentioned means comprising chains extending between said second conveyors for driving said third conveyors whereby said chains will be out of the way of operators supported upon said platforms.

5. A potato digger and picker for operating on two rows of potatoes simultaneously having in combination, an elongated frame comprising spaced pairs of substantially parallel members having means at its front end for connection to a tractor, a pair of transversely spaced digger blades at the front of said frame beneath the same and longitudinally aligned substantially with said rows, endless potato-supporting conveyors comprising swingingly connected transversely extending spaced rods extending rearwardly from said blades respectively between said frame members, a second potato-supporting picker conveyor comprising swingingly connected transversely extending spaced rods in the rear of each of said conveyors and longitudinally aligned therewith, said second conveyors having their front ends disposed beneath the rear ends of said first mentioned conveyors and having rear portions extending upwardly at a decided angle, a third endless potato-supporting picker conveyor comprising swingingly connected transversely extending spaced rods in the rear of each of said second conveyors and having its front end disposed below the rear end of said second conveyor, said third conveyor being at a much higher level than said first mentioned conveyor and extending downwardly slightly toward its rear end, a pair of supporting wheels for said frame transversely aligned with said second conveyors, a platform for supporting operators at each side of said frame extending longitudinally thereof along the rear portion of said first mentioned conveyor and the front portion of said second conveyors, a second platform for supporting operators extending longitudinally of said frame above each of said wheels and along the side of said second conveyors, a third platform for supporting operators at each side of said frame in the rear of said wheels extending along the sides of said third conveyors respectively at a much lower level than said conveyors, a motor carried by said frame above one of said first mentioned conveyors, a shaft extending across said frame, means for driving said shaft from said motor, a second shaft extending transversely of said frame, an endless chain for driving said second shaft from said first mentioned shaft and disposed between said second conveyors, a third shaft in the rear of said second shaft extending transversely of said frame, means for driving said third shaft from said second shaft, and means for driving all of said conveyors from said shafts to move the top runs of said conveyors rearwardly whereby vines and the larger extraneous material can be picked from said first mentioned and second conveyors and smaller stones and other smaller extraneous material can be picked from said third conveyors.

6. A potato digger and picker for operating on two rows of potatoes simultaneously having in combination, an elongated frame comprising spaced pairs of substantially parallel members having means at its front end for connection to a tractor, a pair of transversely spaced digger blades at the front of said frame beneath the same and longitudinally aligned substantially with said rows, endless openwork articulated conveyors having potato-supporting movable members extending rearwardly from said blades respectively, a second openwork articulated picker conveyor having potato-supporting movable members extending rearwardly from each of said conveyors and disposed to receive potatoes and extraneous articles directly therefrom, said second conveyor extending upwardly at a decided angle, a third endless articulated picker conveyor having potato-supporting movable members extending rearwardly from each of said second conveyors adapted to receive therefrom and extending slightly downwardly toward their rear ends, said third conveyors being at a much higher level than said first mentioned conveyors, platforms for supporting picking operators at the remote sides of said conveyors whereby vines and the larger extraneous material can be picked from said first mentioned, and second conveyors by operators supported on said platforms, and smaller stones and other smaller extraneous material can be picked from said third conveyors by other operators supported on said platforms, and means for discharging potatoes received from said third conveyors.

7. A potato digger and picker for operating on two rows of potatoes simultaneously having in combination, an elongated frame comprising spaced pairs of substantially parallel members having means at its front end for connection to a tractor, a pair of transversely spaced digger blades at the front of said frame beneath the same and longitudinally alined substantially with said rows, a pair of adjacent endless openwork articulated conveyors having moving potato-supporting members and extending rearwardly from said blades respectively, a second openwork articulated endless picker conveyor having moving potato-supporting members and extending rearwardly from each of said conveyors, longitudinally alined therewith and disposed to receive potatoes and extraneous material directly therefrom, said second conveyors being adjacent each other and extending upwardly at a decided angle, a third endless conveyor having moving potato-supporting members and extending rearwardly from each of said second conveyors longitudinally alined therewith and positioned to receive material therefrom, said third conveyors being adjacent each other, sets of platforms extending along the remote sides of said conveyors respectively for supporting operators, and means receiving from said third conveyors for discharging potatoes whereby vines and the larger extraneous material can be picked from said second conveyors by operators supported on said platforms, and smaller stones and other smaller extraneous material can be picked from said third conveyors by operators, and said picking can be done from only two sets of platforms from all of said conveyors.

8. A potato digger and picker for operating on two rows of potatoes simultaneously having in combination, an elongated frame comprising spaced pairs of substantially parallel members having means at its front end for connection to a tractor, a pair of transversely spaced digger blades at the front of said frame beneath the same and longitudinally alined substantially with said rows, a pair of adjacent endless openwork articulated endless conveyors having moving potato-supporting members and extending rearwardly from said blades respectively, a second openwork articulated endless picker conveyor having moving potato-supporting members and extending rearwardly from each of said conveyors, longitudinally alined therewith and disposed to receive potatoes and extraneous material directly therefrom, said second conveyors being adjacent each other and extending upwardly at a decided angle, a third endless conveyor having moving potato-supporting members and extending rearwardly from each of said second conveyors longitudinally alined therewith and positioned to receive material therefrom, said third conveyors being adjacent each other, sets of platforms extending along the remote sides of said conveyors respectively for supporting operators, means for driving said first mentioned conveyors at greater speed than said second and third conveyors whereby operators supported on said platforms will have sufficient time to pick all extraneous matter from said conveyors.

9. A potato digger and picker for operating on two rows of potatoes simultaneously having in combination, an elongated frame comprising spaced pairs of substantially parallel members having means at its front end for connection to a tractor, a pair of transversely spaced digger blades at the front of said frame beneath the same and longitudinally alined substantially with said rows, a pair of adjacent endless openwork articulated endless conveyors having moving potato-supporting members and extending rearwardly from said blades respectively, a second openwork articulated endless picker conveyor having moving potato-supporting members and extending rearwardly from each of said conveyors, longitudinally alined therewith and disposed to receive potatoes and extraneous material directly therefrom, said second conveyors being adjacent each other and extending upwardly at a decided angle, a third endless conveyor having moving potato-supporting members and extending rearwardly from each of said second conveyors longitudinally alined therewith and positioned to receive material therefrom, said third conveyors being adjacent each other, sets of platforms extending along the remote sides of said conveyors respectively for supporting operators, and a motor carried on said frame for driving said conveyors at different speeds whereby operators supported on said platforms will have sufficient time to pick all extraneous matter from said conveyors.

References Cited in the file of this patent

UNITED STATES PATENTS

| Number | Name | Date |
|---|---|---|
| 494,684 | Nicholson | Apr. 4, 1893 |
| 1,046,224 | Scharbach | Dec. 3, 1912 |
| 1,487,642 | Wiseman | Mar. 18, 1924 |
| 1,882,636 | Johnson | Oct. 11, 1932 |
| 1,953,317 | Stoltenberg | Apr. 3, 1934 |
| 2,081,346 | Altgelt | May 25, 1937 |
| 2,093,920 | McCoy | Sept. 21, 1937 |
| 2,365,077 | Hertzler et al. | Dec. 12, 1944 |
| 2,373,426 | Spafford | Apr. 10, 1945 |
| 2,379,198 | Templeton | June 26, 1945 |
| 2,381,172 | Lundberg | Aug. 7, 1945 |
| 2,421,999 | Dahlman | June 10, 1947 |
| 2,447,399 | Dey | Aug. 17, 1948 |
| 2,559,965 | Innes | July 10, 1951 |
| 2,578,189 | Johnston | Dec. 11, 1951 |